April 28, 1925.  
O. C. SCHMIDT  
UNLOADING MEANS FOR MEAT CUTTING MACHINES  
Filed Nov. 12, 1923 4 Sheets-Sheet 1
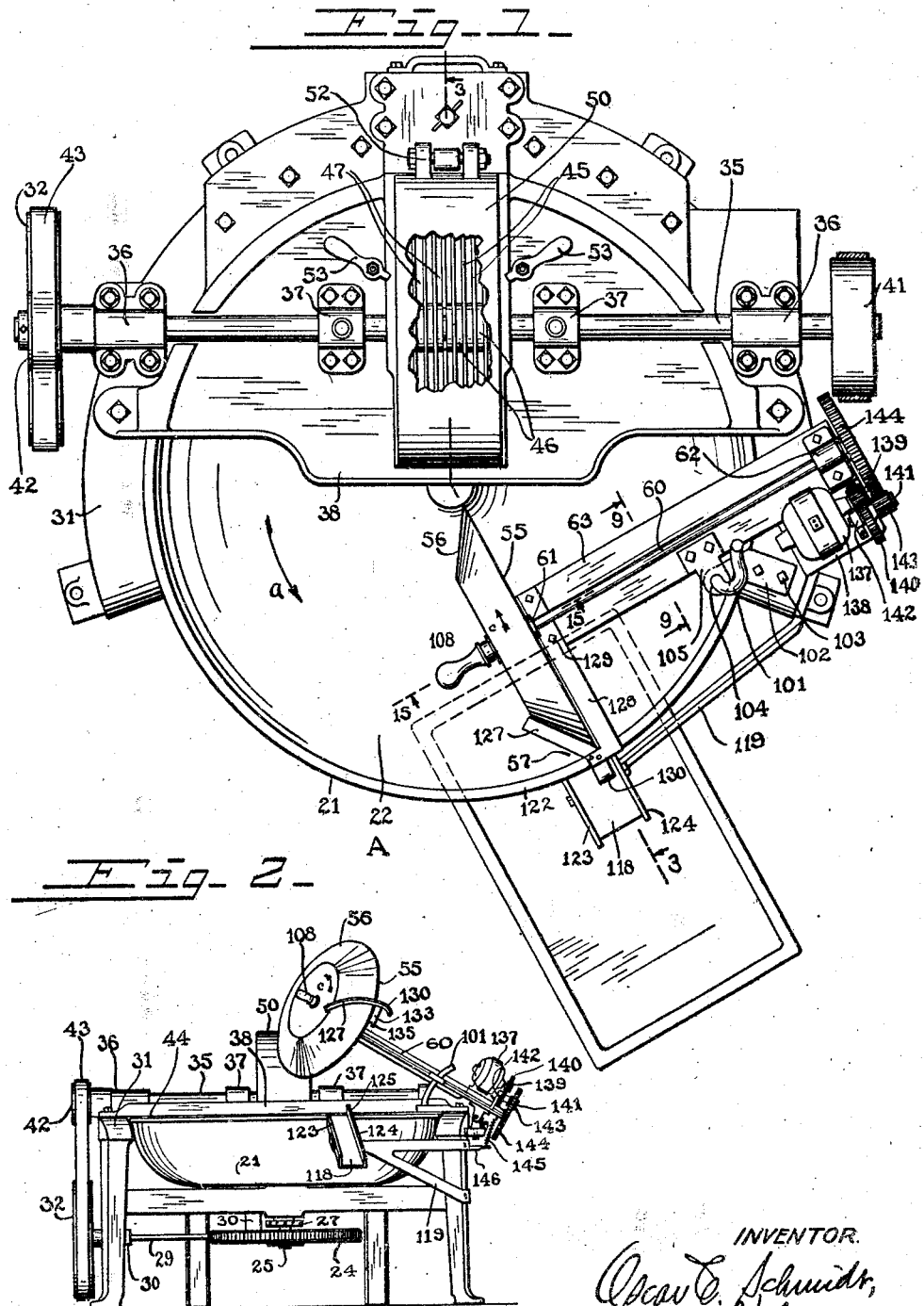

April 28, 1925.

O. C. SCHMIDT

UNLOADING MEANS FOR MEAT CUTTING MACHINES

Filed Nov. 12, 1923 4 Sheets-Sheet 2

INVENTOR.

April 28, 1925.
O. C. SCHMIDT
1,535,794
UNLOADING MEANS FOR MEAT CUTTING MACHINES
Filed Nov. 12, 1923
4 Sheets-Sheet 3
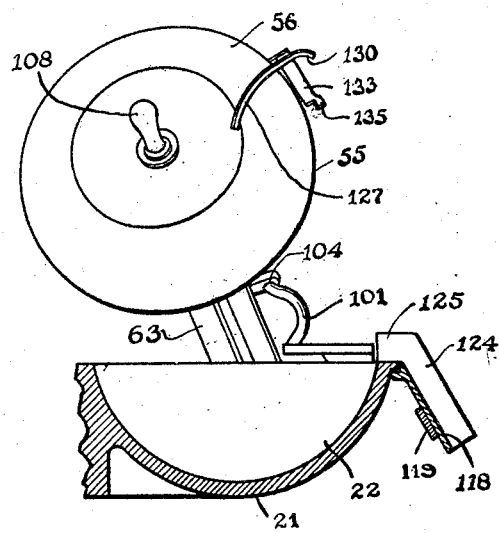
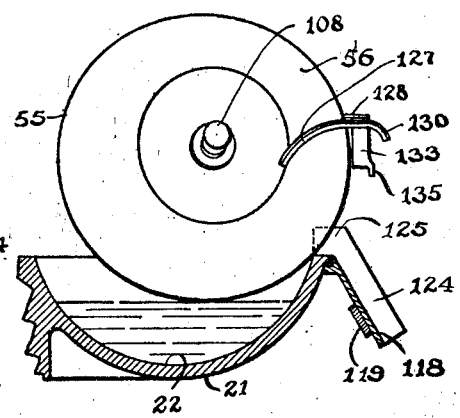
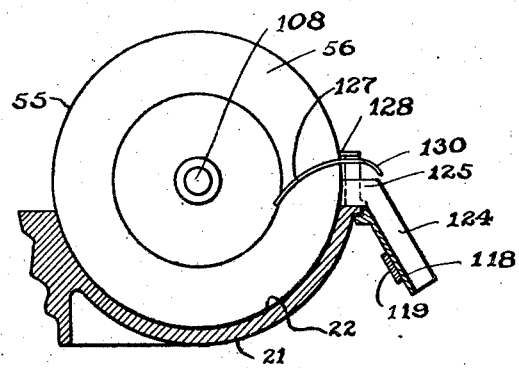
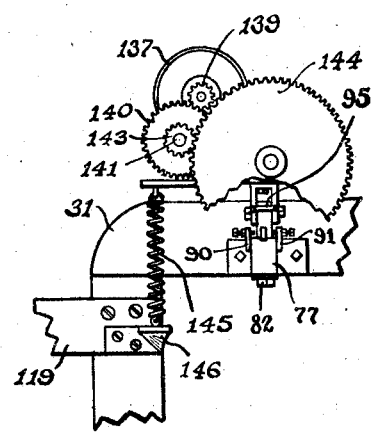
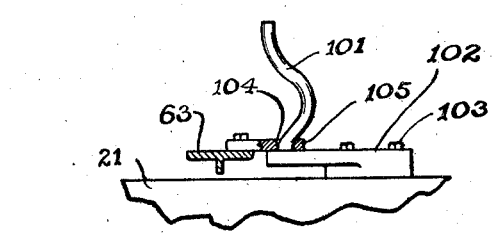
INVENTOR.

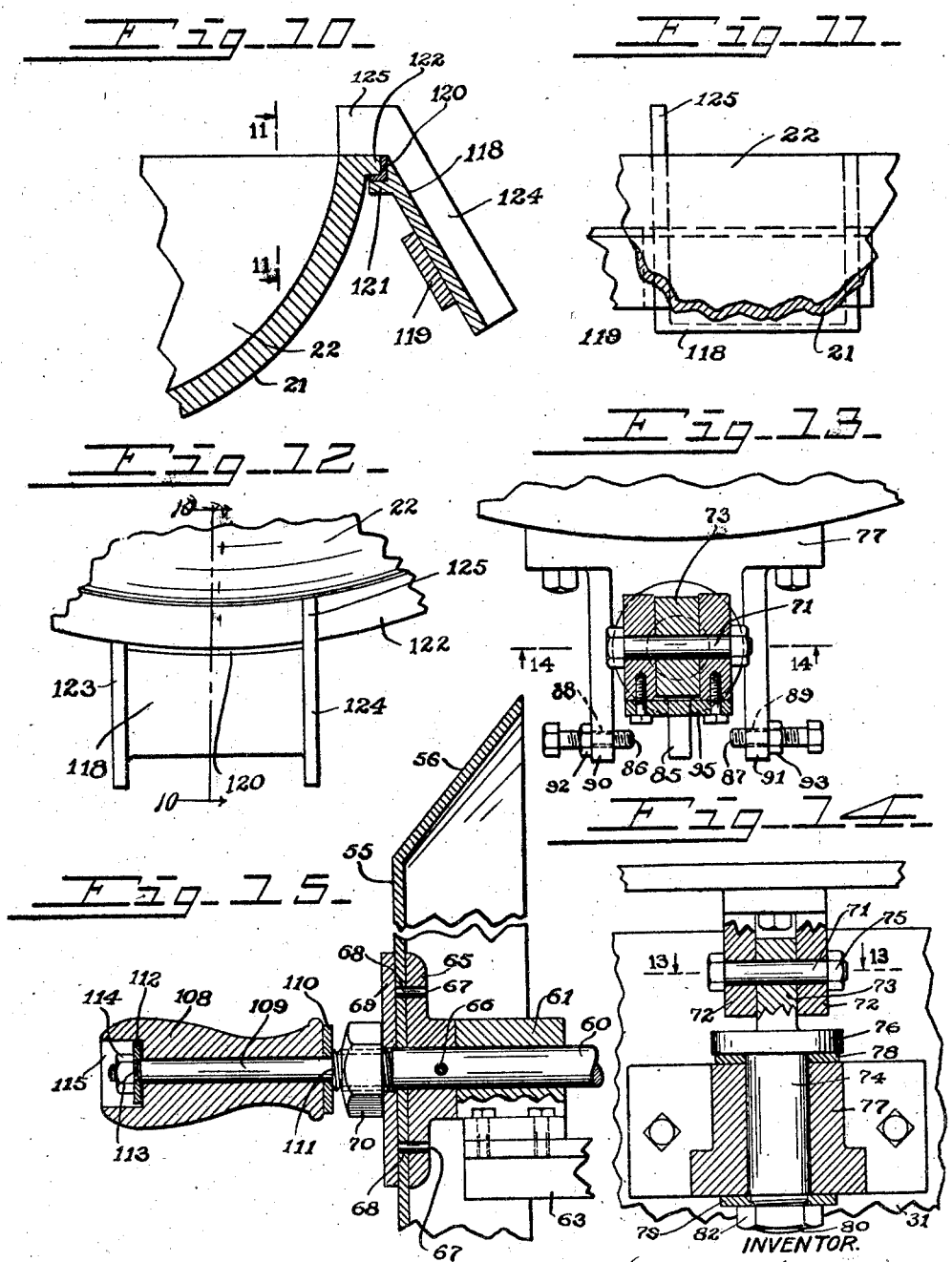

Patented Apr. 28, 1925.

1,535,794

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

UNLOADING MEANS FOR MEAT-CUTTING MACHINES.

Application filed November 12, 1923. Serial No. 674,135.

*To all whom it may concern:*

Be it known that I, OSCAR C. SCHMIDT, a citizen of the United States, residing at Cincinnati, in the county of Hamilton and State of Ohio, have invented certain new and useful Improvements in Unloading Means for Meat-Cutting Machines, of which the following is a specification.

The meat industry is subject to Federal inspection under the jurisdiction of the Bureau of Animal Industry, one of the rules of which is to limit the manual handling of meat for sanitary reasons. While such rule has been in effect for quite a number of years it is still a general practice to manually scoop the cut meat by hand from meat cutting machines. I have invented means whereby the unloading of the cut meat from meat cutting machines is accomplished without the necessity of manually handling the same.

It is the object of my invention to provide means whereby to unload the cut meat from a meat cutting machine; further, to provide means whereby unloading of the cut meat from a meat cutting machine is accomplished by relative rotation between an unloader and the container for the meat; further, to provide means arranged to intercept the path of travel of the meat and to direct it out of its container; further, to provide a rotating part arranged to unload the cut meat from its container by being inserted into the container in contact with the cut meat; further, to provide an unloading wheel having a rotating sloping periphery for unloading the meat by coaction with said rotating sloping periphery; further, to provide a rotating wheel arranged to coact with the annular wall of a rotating trough whereby the cut meat is forced between converging walls, one of which rotates transversely to the path of the cut meat for unloading the same from the receptacle; further, to provide a rotating wheel arranged to rotate crosswise of the path of movement of a rotating annular trough, with the periphery of said rotating disk coacting with the inner cross-sectionally arcuate supporting face of the trough for unloading the cut meat from the trough; further, to provide scraping means for the unloader; and, further, to provide an unloading spout for the trough of the meat cutting machine and an unloader arranged to coact with the meat in the trough for unloading the cut meat from the trough into said spout.

The invention will be further readily understood from the following description and claims, and from the drawings, in which latter:

Fig. 1 represents a plan view of my improved device shown in connection with a meat cutting machine, partly broken away.

Fig. 2 is a front elevation of the same, showing the unloader raised.

Fig. 5 is an end view of my improved device shown in retracted position with relation to a meat-trough, the latter shown in vertical section on the line 5—5 of Fig. 4.

Fig. 6 is a similar view, with the unloading device in initial unloading position.

Fig. 7 is a similar view, with the unloading device in final unloading position.

Fig. 8 is an end view of the driving and mounting means for the unloading device, partly broken away.

Fig. 9 is a detail of the guiding means for the unloading device, taken in section on the line 9—9 of Fig. 1, and partly broken away.

Fig. 10 is a cross-sectional detail, showing the connection of the discharge chute with the meat-trough, taken in section on the line 10—10 of Fig. 12.

Fig. 11 is an inside elevation of the same, viewed in the direction of the arrows on the line 11—11 of Fig. 10.

Fig. 12 is a plan view of the same.

Fig. 13 is a horizontal section of the mounting means for the unloading device, taken in the plane of the line 13—13 of Fig. 14.

Fig. 14 is a vertical section of the same, taken in the plane of the line 14—14 of Fig. 13; and, Fig. 15 is a detail in vertical section, taken on the line 15—15 of Fig. 1.

Figure 3:
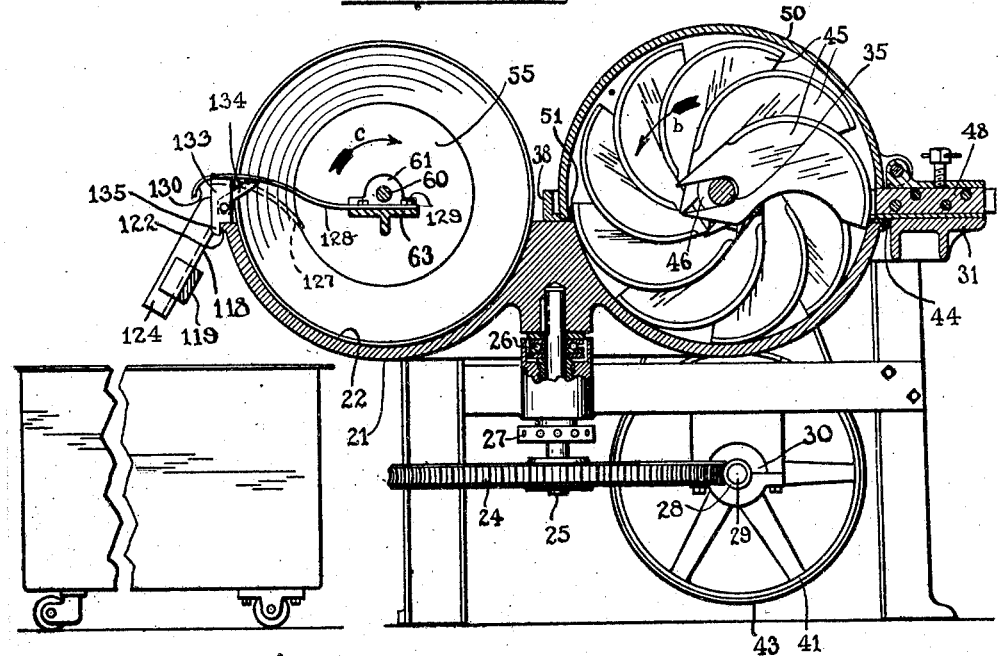
Fig. 3 is a vertical cross-section of my improved device, taken on the irregular line 3—3 of Fig. 1.
Figure 4:
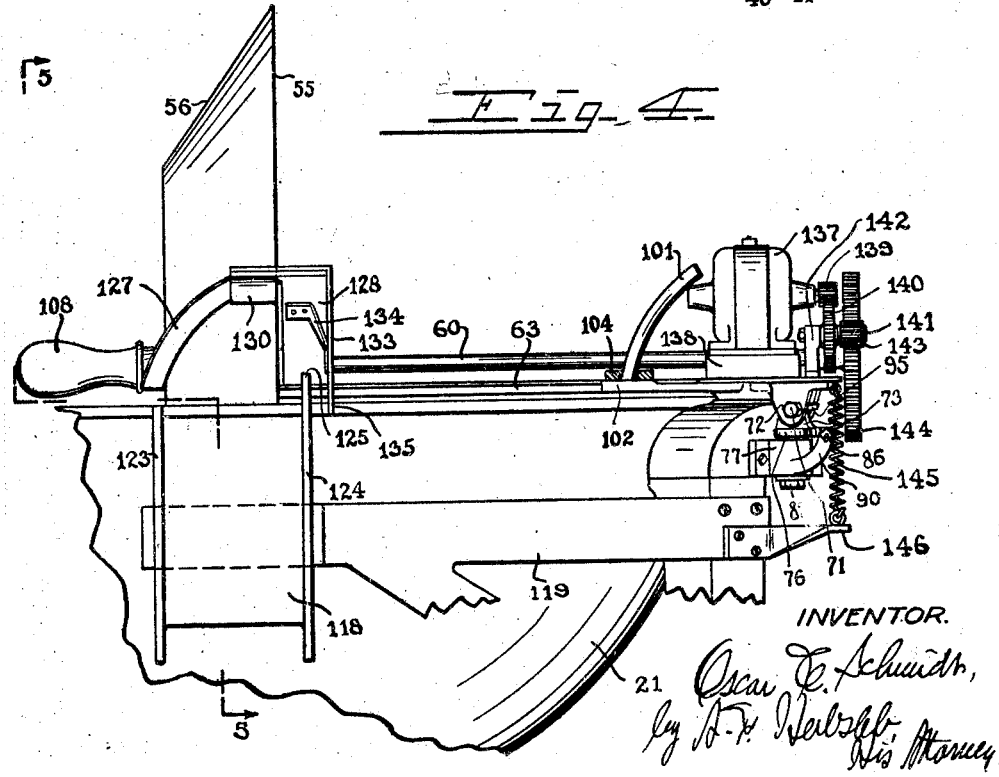
Fig. 4 is an enlarged front elevation of my improved device, in lowered position, and shown in connection with a meat cutting machine, partly broken away.

I have exemplified the meat cutting machine as comprising a rotary bowl 21, having an annular meat-trough 22, which is arcuate in cross-section. Suitable means are provided for rotating the bowl, in the direction of the arrow $a$, which may be instanced as including a worm-wheel 24 for rotating a shaft 25, to which the bowl is secured. The bowl is supported as a ball bearing 26 adjustable by a step-screw 27. A worm 28 meshes with the worm-wheel, and is fixed to a shaft 29 journaled in bearings 30 of a suitable frame 31 and having a pulley 32 thereon.

A knife-shaft 35 is journaled in bearings 36 in the frame and in bearings 37 on a cover 38, which covers the rear part of the bowl. This shaft is suitably driven, as by means of a pulley 41 fixed thereto. A pulley 42 fixed to said shaft has a belt 43 received thereover and over the pulley 32 for transmitting motion from the knife-shaft to the shaft 29 for rotating the bowl.

There is a joint 44 between the upper edge of the bowl and the cover 38 to retain the meat in the bowl and prevent its leaking or being forced over the edge of the bowl when under the cover.

A series of knives 45 are fixed to the shaft 35, and are shown as scimiter-like blades fixed side by side to said shaft, separated by collars 46 and arranged to coact with the teeth 47 of a comb 48. The cutting edges of the blades coact with the inner face of the meat-trough for cutting the meat, being rotated in the direction of the arrow $b$. The cutters are located under a hood 50 and pass through an opening 51 in the cover, the hood being arranged to close said opening and cover said knives. The hood is hinged on a hinge 52 to the cover and is arranged to be clamped to the cover by means of clamps 53.

The cutting machine employed may be any suitable cutting machine. I have shown the essential elements of an exemplifying cutting machine such as that shown and described in Letters Patent No. 1,253,892, granted on my application for patent on meat cutting machine, and dated January 15, 1918.

In the operation of the exemplified cutting machine, the meat to be cut is loaded into the trough at the front portion of the machine, from the operator's position A, and the trough and the cutter-blades rotated for cutting the meat. When the meat has been cut to proper fineness and is of the proper consistency and texture and in what is known to the trade as seasoned condition, it is necessary to unload the meat quickly from the trough. I accomplish this unloading without subjecting the meat to manual handling and in quick and efficient manner for promptly unloading the meat in order to quickly remove the same from the action of the cutter-blades.

I accomplish this unloading by means of a device arranged to be dipped into the body of meat in the trough, and cause relative rotation between said device and the trough. I prefer to rotate the device for accelerating the unloading. This device is exemplified as an unloader 55, shown as a wheel, arranged to be rotated in a direction crosswise of the trough, in the direction of the arrow $c$. I prefer that the unloader have a receding periphery exemplified at 56, which preferably recedes from the wall of the trough for forming a contracting channel between it and the wall of the trough, as exemplified at 57, whereby unloading of the meat is aided. I have exemplified the unloader in the form of a wheel as comprising a disk, the outer portion of which recedes for forming a saucer-like disk, the said outer portion acting on the cut meat for unloading the same.

The unloader is arranged to be rotated by a shaft 60, journaled in bearings 61, 62, on a supplemental frame 63, which is shown as comprising an arm extending lengthwise of the shaft. The securing means of the disk to the shaft are exemplified as a flange 65 fixed to the shaft, as by a pin 66. The flange is provided with pins 67 received in holes 68 in the disk. A washer 69 is received over the shaft at the outside of the disk, a nut 70 clamping the washer, the disk and the flange and shaft together.

The frame 63 is exemplified as a pivoted frame, and preferably has universal movement with relation to the meat-trough. It is shown mounted on a horizontal pivot 71, shown as a bolt received through lugs 72 depending from the frame and a lug 73 on an upright pivot-piece 74, a nut 75 holding the pivot-bolt 71 in place. The pivot-piece 74 has a collar 76, and has pivotal movement in a bearing 77 fixed to the main frame 31. The collar rests on a washer 78 between the collar and the bearing. A washer 79 is received about the reduced threaded end 80 of the pivot-piece against a shoulder 81 of said pivot-piece, a nut 82 clamping the washer 79 to the pivot-piece in such relation as to permit the pivot-piece to rotate on an upright axis.

The pivot-piece is provided with a wing 85 arranged to contact stops 86, 87, shown as bolts received through threaded holes 88, 89, in wings 90, 91, extending from the bearing 77, and held in adjusted positions by means of jam-nuts 92, 93. Lateral swinging movement of the unloading device is limited by said stops, and up and down swinging movement of the unloading device is permitted by the pivot-bolt 71. Retracting movement of the pivoted frame may be limited by a stop 95 shown as a bar secured to the lugs 72 and arranged to strike the lug 73.

Further guiding means for the unloading device may be provided, if desired, exemplified, for instance, as a guide-bar 101, extending from a bracket 102, fixed to the frame of the machine, as by bolts 103, and coacting with an eye 104 on a bracket 105 fixed to the supplemental frame 63. The form of this guide-bar is such preferably that when the unloading device is raised away from the bowl, it is moved laterally away from the operator's position A, which is at the front of the machine (see Figs. 1 and 5), and when the unloading device is moved toward the trough, it is guided in such manner so that its outer periphery will coact with the outer edge of the inner annular face of the meat-trough and its lower edge will coact with the meat in the meat-trough in order to initiate the unloading of the meat. (See Fig. 6.)

The form of the guide-rod is, further, such as to cause the periphery of the unloading device to follow the form of the outer portion of the inner face of the meat-trough, in order to progressively discharge the meat therefrom. When the unloading device is in the position shown in Fig. 7, it is in position to complete the discharge of the meat from the trough.

I have shown the diameter of the discharging device such that its lower portion will substantially fill the cross-sectional dimensions of the meat-trough, although it will be understood that unloading devices of less relative dimensions may be employed, as the discharging device may be moved laterally from side to side across the inside of the meat-trough for coaction with the various portions of the same crosswise of the trough for progressively unloading the meat.

The unloader may be suitably manipulated for coaction thereof with the meat container. This may be accomplished by a manipulated device controlled by the operator, and exemplified as a handle on the outer end of the supplemental frame convenient to the operator. I have shown this as a handle 108 loose on the reduced end 109 of the shaft and positioned between a washer 110 limited by a shoulder 111 and a washer 112 limited by a shoulder 113 and held in place by a nut 114, the washer 112 and nut 114 being located in a recess 115 in the outer end of the handle.

The trough rotates in the direction of the arrow $a$, the body of cut meat dough, herein referred to as meat, moving with the trough in its rotation. The meat is forced into contact with the unloader by the rotation of the trough, when the unloader is moved into range with the meat for unloading the meat. The rotation of the unloader moves the meat in the direction of rotation of the unloader and carries the meat with it in unloading direction, the unloader rotating in the direction of the arrow $c$.

The direction of unloading of the cut meat is instanced as across the outer periphery of the trough. In order to guide the meat being discharged, I provide a chute 118 arranged to coact with the outer periphery of the trough. The chute is preferably supported on a bracket 119 secured to the main frame. The chute is shown as slanting downwardly from the outer periphery of the trough and preferably has a bearing connection with said outer periphery so as to form a close joint therewith, this bearing connection being shown as a Babbitt lining 120 fixed to the chute between the inner end of the chute and a flange 121 thereon, and the outer peripheral flange 122 of the bowl. The chute is exemplified as having side walls 123, 124, the wall 124 having an extension 125 which contacts the upper face of the outer wall of the bowl and acts as a wiper for wiping any meat which may be discharged on the edge of the bowl into the chute.

The portion of the unloading wheel which is contacted by the meat when unloading the same is preferably provided with a scraper 127. In the present exemplification, the flaring portion of the periphery of the unloading wheel only is likely to be contacted by the meat. This scraper is exemplified as moving with the unloading wheel and supported from the supplemental frame on which the same is mounted by means of a bracket 128 extending from said supplemental frame, shown fixed thereto by bolts 129. A deflector 130 acts in conjunction with the scraper for aiding in directing the scraped meat toward the bowl and chute. The deflector is shown as a continuation of the scraper.

A stop 133 is also preferably supported from said bracket, and is shown braced thereto by means of a brace 134. The stop is arranged to rest on the outer edge of the bowl, and is shown provided with a tongue 135 arranged to contact the outer periphery of said edge, and aids in positioning the unloading wheel with relation to the bowl.

I have exemplified means for rotating the unloading wheel mounted on the supporting frame for the same. These rotating means are exemplified as an electric motor 137, mounted on a bracket 138 extending from said supplemental frame. A pinion 139 on the motor shaft meshes with a gear 140 on a stud-shaft 141 fixed in a bearing 142 on said bracket. A pinion 143 rotates with the gear 140, and meshes with the gear 144 fixed to the shaft 60 which rotates the rotary unloading device.

The stop 95 on the swinging frame may limit the retracting movement of the unloading device. This retracting movement may be aided or caused by a spring 145 between the rear end of the supplemental frame and a bracket 146 secured to the main frame, for normally urging retraction of the unloading device and movement of the unloading wheel out of the meat container.

Having thus fully described my invention, what I claim as new, and desire to secure by Letters Patent, is:

1. In a meat cutting machine, the combination of a rotary meat-trough, a rotary unloader, and means whereby to move said rotary unloader into said meat-trough.

2. In a meat cutting machine, the combination of a rotary meat-trough, a rotary unloader, means whereby to move said rotary unloader into said meat-trough, and means to automatically retract said unloader.

3. In a meat cutting machine, the combination of a rotary meat-trough, a rotary unloader, and guiding means for said unloader whereby to guide the same in proximity to and crosswise of the inner face of the wall of said meat-trough.

4. In a meat cutting machine, the combination of a meat-container having a cavity provided with a wall for containing the meat, and a rotary unloader having a meat-contacting face which slants with relation to said wall to discharge meat from said container.

5. In a meat cutting machine, the combination of a meat-container having a cavity provided with a wall for containing the meat, and a rotary unloader having a meat-contacting face which slants with relation to said wall to form a contracting recess between said face and said wall, and means for moving the meat into said recess.

6. In a meat cutting machine, the combination of a meat-container having a cavity provided with a wall for containing the meat, and a rotary unloader having a meat-contacting face which slants with relation to said wall to form a contracting recess between said face and said wall, means for moving the meat into said recess, and controlling means for controlling the position of said rotary unloader crosswise of said wall.

7. In a meat cutting machine, the combination of a meat-container having a cavity provided with a wall for containing the meat, a rotary unloader having a meat-contacting face which slants with relation to said wall to form a contracting recess between said face and said wall at one side of said wall, means for moving the meat into said recess, and a chute for receiving the meat at the other side of said wall at said recess.

8. In a meat cutting machine, the combination of a meat-container having a cavity provided with a wall for containing the meat, a rotary unloader having a meat-contacting face which slants with relation to said wall to form a contracting recess between said face and said wall at one side of said wall, means for moving the meat into said recess, and a scraper for said meat-contacting face.

9. In a meat cutting machine, the combination of a rotary meat-trough, cutting means co-operating therewith, and a rotary disk arranged to be received in said trough for coaction with the meat therein to unload the meat therefrom.

10. In a meat cutting machine, the combination with a meat-container, of a saucer-like rotary unloader.

11. In a meat cutting machine, the combination of a rotary bowl for the meat, cutting means coacting therewith to cut the meat, and a saucer-like rotary unloader arranged to be received in said bowl into contact with the meat for unloading the meat.

12. In a meat cutting machine, the combination of a rotary bowl for the meat, cutting means coacting therewith to cut the meat, a saucer-like rotary unloader arranged to be received in said bowl into contact with the meat for unloading the meat, a chute, and means for supporting the chute at the periphery of the bowl for receiving the meat being unloaded.

13. In a meat cutting machine, the combination of a rotary bowl for the meat, rotary cutting means for cutting the meat operative in said bowl, a saucer-like rotary unloader, and means for supporting the same for coaction of its outer periphery with the meat-supporting face in said bowl for unloading the meat from said bowl.

14. In a meat cutting machine, the combination with a meat-container, of a rotary unloader, means whereby to move said rotary unloader into and out of said meat-container, and arranged by contact with the meat in said container to discharge the meat out of said container.

15. In a meat cutting machine, the combination with a meat-container, of a frame movable with relation to said meat-container, and an unloader and driving means for said unloader supported by said movable frame.

16. In a meat cutting machine, the combination with a meat-container, of a frame movable with relation to said meat-container, an unloader and driving means for said unloader supported by said movable frame, and means normally retracting said movable frame.

17. In a meat cutting machine, the combination with a meat-container, of a frame movable with relation to said meat-container, an unloader and driving means for said unloader supported by said movable frame, means normally retracting said movable frame, and a stop to limit retracting movement of said movable frame.

18. In a meat cutting machine, the combination with a meat-container, of a frame movable with relation to said meat-container, an unloader mounted on said movable frame, and universal jointing means whereon said movable frame is mounted.

19. In a meat cutting machine, the combination with a meat-container, of a frame movable with relation to said meat-container, an unloader mounted on said movable frame, universal jointing means whereon said movable frame is mounted, and guiding means for said movable frame for guiding said unloader with relation to said meat-container.

20. In a meat cutting machine, the combination with a meat-container, of a frame movable with relation to said meat-container, an unloader mounted on said movable frame, universal jointing means whereon said movable frame is mounted, and means for limiting the universal movement of said movable frame.

21. In a meat cutting machine, the combination with a meat-container, of a frame pivoted with relation thereto, a shaft thereon, a rotary unloader at the swinging end of said frame, and manual manipulating means on said shaft for moving said frame on its pivot whereby to move the outer periphery of said rotary unloader across the wall of said meat-container to unload the meat therein.

22. In a meat cutting machine, the combination with a meat-container, of a pivoted frame, a rotary unloader and an electric motor for driving the same mounted on said pivoted frame, and means for moving said pivoted frame for coaction of said rotary unloader with said meat-container.

In testimony whereof, I have hereunto signed my name in the presence of two subscribing witnesses.

OSCAR C. SCHMIDT.

Witnesses:
DELMA WERNSING,
OWEN T. TAPHORN.